United States Patent
Zhan

(10) Patent No.: US 11,007,814 B1
(45) Date of Patent: May 18, 2021

(54) MOSAIC TILE PAVING DEVICE

(71) Applicant: Jinhua Wanfeng Tools Factory, Jinhua (CN)

(72) Inventor: Hui Zhan, Jinhua (CN)

(73) Assignee: JINHUA WANFENG TOOLS FACTORY, Jinhua (CN)

( * ) Notice: Subject to any disclaimer, the term of this patent is extended or adjusted under 35 U.S.C. 154(b) by 0 days.

(21) Appl. No.: 17/029,271

(22) Filed: Sep. 23, 2020

(30) Foreign Application Priority Data

Aug. 21, 2020 (CN) .......................... 202010847361.5

(51) Int. Cl.
| | | |
|---|---|---|
| *B44C 3/12* | (2006.01) | |
| *B25J 1/00* | (2006.01) | |
| *B25B 11/00* | (2006.01) | |
| *B25J 15/06* | (2006.01) | |

(52) U.S. Cl.
CPC .............. *B44C 3/12* (2013.01); *B25B 11/007* (2013.01); *B25J 1/00* (2013.01); *B25J 15/06* (2013.01)

(58) Field of Classification Search
CPC ... B44C 3/12; B25B 11/007; B25J 1/00; B25J 15/06
See application file for complete search history.

(56) References Cited

U.S. PATENT DOCUMENTS

| | | | | |
|---|---|---|---|---|
| 5,184,585 A * | 2/1993 | Wilson | ................... | F02N 19/001 123/179.21 |
| 5,795,001 A * | 8/1998 | Burke | ................... | B65G 49/061 294/185 |
| 8,104,809 B1 * | 1/2012 | Mayhugh | .............. | B25B 11/007 294/187 |
| 10,030,690 B2 * | 7/2018 | Liu | ......................... | F16B 47/00 |
| 2012/0326458 A1 * | 12/2012 | Yeh | ....................... | B25B 11/007 294/25 |

FOREIGN PATENT DOCUMENTS

WO  WO-2019215722 A1 * 11/2019 ........... B66C 1/0287

OTHER PUBLICATIONS https://grabo.com/what-does-grabo-grab/—What Does Grabo Grab?, 2019.*

* cited by examiner

*Primary Examiner* — Stephen A Vu

(57) ABSTRACT

A mosaic tile paving device is provided. The mosaic tile paving device includes suckers and a handle. The paving device is characterized in that: Multiple suckers are installed on the vacuuming shell. The suckers and the mosaic tiles can be fixed together or separated by changing the air volume in the vacuuming shell. A handle is connected on the vacuuming shell.

7 Claims, 3 Drawing Sheets

MOSAIC TILE PAVING DEVICE

TECHNICAL FIELD

The invention relates to the technical field of tile paving devices, in particular relates to a mosaic tile paving device.

BACKGROUND TECHNOLOGY

Mosaic tiles are tile group fixed on the soft base plate by multiple small tiles and often used for swimming pools, bathrooms and fish tanks. The current mosaic tiles are usually paved artificially. However, since the soft base plate may easily lead to unevenness between horizontal small tiles and longitudinal small tiles in the same tile group. One mosaic tile is hard to pave, let alone a large area of swimming pool, bathroom and fish tank.

INVENTION CONTENT

The invention aims to overcome the defects of prior art and provides a mosaic tile paving device. By setting multiple suckers in a vacuumizing module, the invention can solve the technical problems of high difficulty and low efficiency during artificial paving of mosaic tiles.

To achieve the above purpose, the invention provides a mosaic tile paving device which includes suckers and a handle; Multiple suckers are installed on the same vacuumizing shell. The suckers and the mosaic tiles are fixed together or separated by changing the air volume in the vacuumizing shell; A handle is connected on the vacuumizing shell. Multiple suckers are arranged at the bottom of the vacuumizing shell, and each sucker corresponds to a small tile on one mosaic tile. When sucking air from the vacuumizing shell, the air in the suckers is reduced slowly so that each small tile can be sucked on the suckers, and the handle can realize carrying and paving of the whole mosaic tile. During paving, the whole mosaic tile can keep in level relatively, and the paving efficiency is higher.

Preferentially, the vacuumizing shell sucks air by connecting with a suction pump. The suction efficiency can be improved by the suction pump.

Preferentially, the suction pump supplies energy by connecting with a battery.

Preferentially, a switch that controls the start and stop of suction pump is arranged on the handle.

Preferentially, a deflation module is arranged on the vacuumizing shell.

Preferentially, the deflation module includes a one-way valve shaft that is connected with the vacuumizing shell and a button that controls the motion of the one-way valve shaft. The button can control the one-way valve shaft to realize sealing and deflation of vacuumizing module.

Preferentially, the deflation module further includes a control rod and a reset spring, wherein the control rod is clamped on the one-way shaft valve and controls its vertical motion, and the reset spring is connected with the end, far away from the one-way valve shaft, of the control rod.

Preferentially, the control rod includes a clip joint that clamps the one-way valve shaft, a rotating groove that extends from the side, far away from the one-way valve shaft, of the clip joint and a rotating arm that extends from the side, far away from the clip joint, of the rotating groove. The rotating arm and the button are connected with the reset spring. The reset spring supports the rotating arm so that the one-way valve shaft can support the vacuumizing module all the time and realize sealing. By rotating the rotating arm, the one-way valve shaft can be lifted, the air can enter the vacuumizing module and the suckers and mosaic tiles can be separated.

Preferentially, the deflation module is partially arranged in the handle. The button of deflation module is arranged outside the handle, while other parts are arranged in the handle, which can reduce the overall area and facilitate installation. The button and the switch arranged on the handle are convenient to use.

Preferentially, a hollow case is arranged between the handle and the vacuumizing shell; Both the suction pump and the battery are arranged in the hollow case. Therefore, the overall paving area can be reduced and the installation is more convenient.

Preferentially, the suckers are two-layer or multi-layer vacuumizing sucker heads. Since the folding distance is longer, mosaic tiles can be close to the vacuumizing shell and keep in level relatively.

Compared with the prior art, the advantageous effect of mosaic tile paving device is as follows: Multiple suckers are arranged at the bottom of the vacuumizing shell, and each sucker corresponds to a small tile of one mosaic tile. When sucking air from the vacuumizing shell, the air in the sucker can be reduced slowly, each small tile can be sucked on the suckers, and the handle can realize carrying and paving of the whole mosaic tile. During paving, the whole mosaic tile can keep in level relatively, and the paving efficiency is higher.

The characteristics and advantages of the invention are described in details through embodiment and attached figures.

DESCRIPTION OF ATTACHED FIGURES

Figure 3:
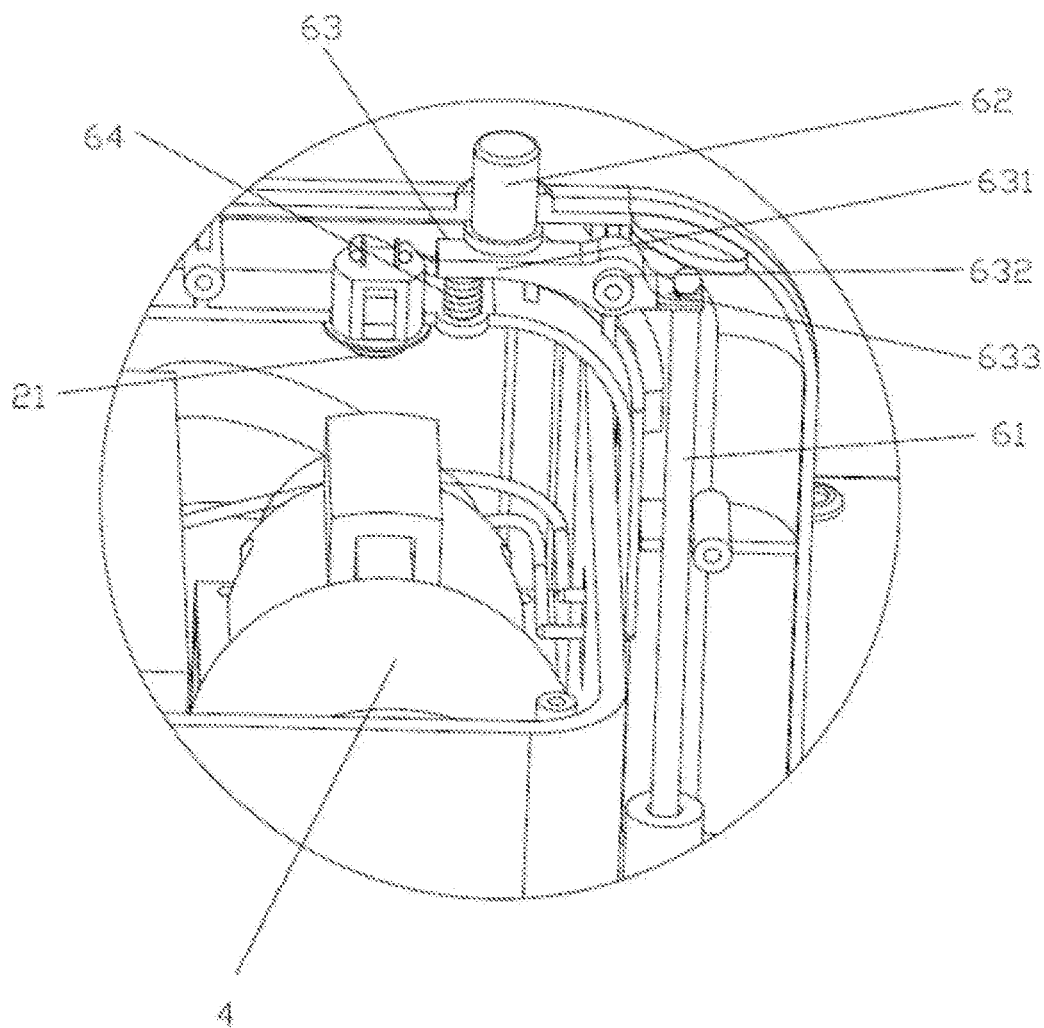
Figure 4:
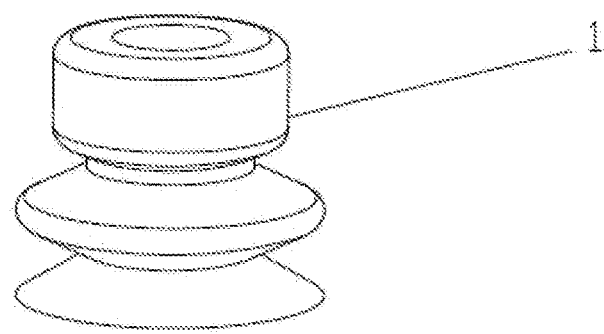

FIG. 3 is the enlarged structure diagram of Position A of mosaic tile in this embodiment FIG. 4 is the enlarged structure diagram of suckers of mosaic tile in this embodiment In the figure: 1. Sucker; 2. Handle; 21. Switch; 3. Vacuumizing shell; 4. Suction pump; 5. Battery; 6. Deflation module; 61. One-way valve shaft; 62. Button; 63. Control rod; 631. Clip joint 632. Rotating groove; 633. Rotating arm; 64. Reset spring; 7. Hollow case.

SPECIFIC IMPLEMENTATION MODE

To make the purpose, technical scheme and advantages of the invention clearer, the invention is further described through the attached figures and embodiments. However, it should be understood that the specific embodiments described here are intended to explain the invention only rather than limit the scope. Besides, the description of well-known structures and techniques is omitted in the following descriptions to avoid unnecessary confusion of the concepts in the invention.

In the invention, it needs to be noted that the orientation or positional relationship indicated by the terms "center", "upper", "lower", "left", "right", "vertical", "horizontal", "inside" and "outside" is based on the orientation or positional relationship shown in the attached figures, or the normal orientation or positional relationship for product application is only to facilitate and simplify the description of the invention rather than indicating or implying the specific orientation of a device or element or a specific orientation structure and operation. Therefore, it shall not be understood as a limitation of the invention. Besides, the terms "first", "second" and "third" are only used to distinguish descriptions but shall not be understood as indicating or implying relative importance.

Moreover, it shall be noted in the description of this invention that unless otherwise specified and limited, the terms "setting", "installation" and "connection" shall be understood in a broad sense. For example, it can be a fixed connection, a detachable connection or an integrated connection; It can be a mechanical connection or an electrical connection; It can be directly connected, indirectly connected through a medium or the connection in two elements. For the ordinary technicians in this field, the specific meaning of the above terms in the invention can be understood according to the actual situation.

Embodiment I

Figure 1:
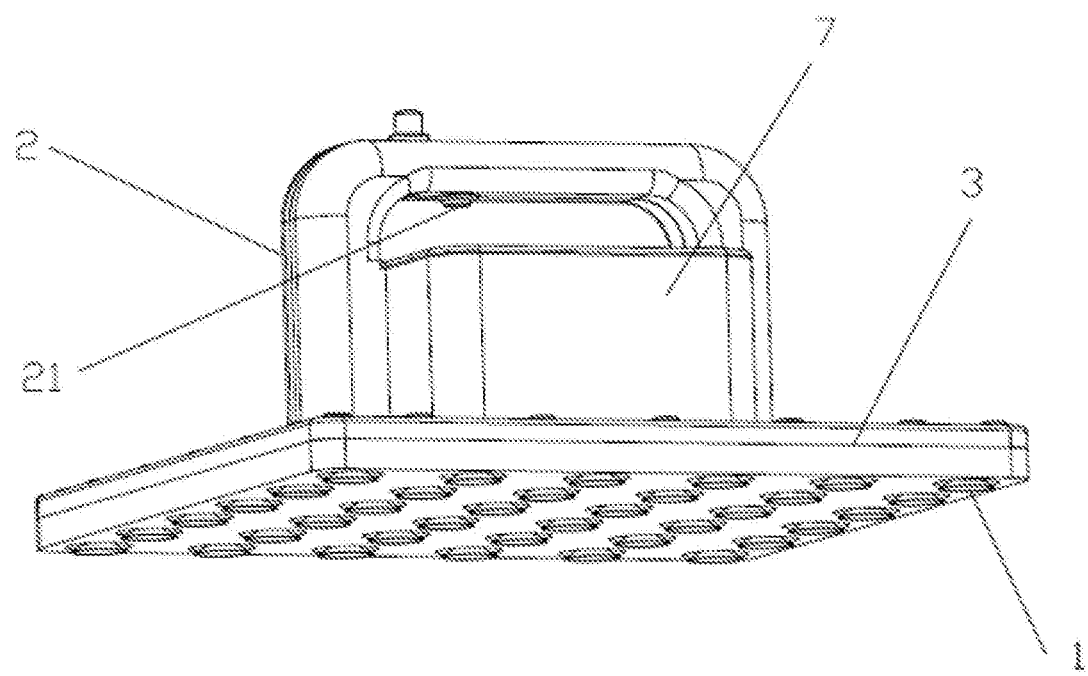
FIG. 1 is the structural diagram of mosaic tile paving device in this embodiment.

As shown in FIG. 1, the embodiment provides a mosaic tile paving device which includes suckers 1 and a handle 2. The suckers 1 are installed on the same vacuumizing shell 3, and the suckers 1 and mosaic tile can be fixed together and separated by changing the air volume in the vacuumizing shell 3. The vacuumizing shell 3 is connected with a handle 2. Specifically, the suckers 1 are fixed at the bottom of the vacuumizing shell 3 horizontally and vertically. After the suckers 1 are pasted on all small tiles of the mosaic tile, the air of vacuumizing shell 3 can be discharged manually. The air in the vacuumizing shell 3 may be lost, but the suckers 1 can suck all small tiles of the mosaic tile tightly. The vacuumizing shell 3 can be carried and paved with the handle 2 so that the whole mosaic tile can keep in level relatively. The mosaic tile paving device can ensure the smoothness of the mosaic tile and make the swimming pool more artistic.

Embodiment II

To improve the automation degree of paving device in Embodiment I, the following functions are increased.

Figure 2:
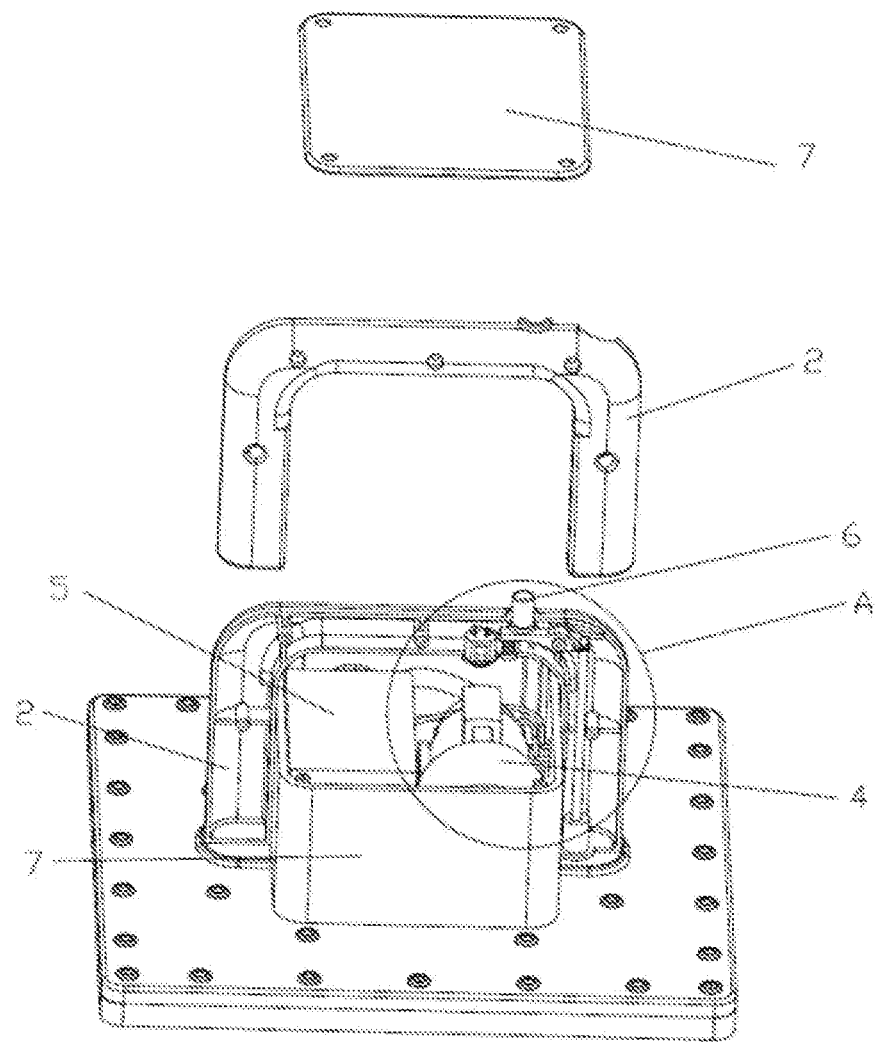
FIG. 2 is the exploded view of mosaic tile paving device in this embodiment.

Further, according to FIG. 2, in an alternative embodiment, the vacuumizing shell 3 can suck air by connecting with a suction pump 4.

Further, according to FIG. 2, in an alternative embodiment, the suction pump 4 can supply energy by connecting a battery 5. The suction pump 4 can be controlled by the battery 5 to suck air and improve the automation degree.

Further, according to FIGS. 1 and 2, in an alternative embodiment, a switch 21 that controls the start and stop of the suction pump 4 is arranged on the handle 2. The switch 21 can control the start and stop of the suction pump 4. When releasing the switch 21, the suction pump 4 can be stopped. The suction pump 4 can be started by pressing the switch 21 and stopped by pressing the switch 21 again.

Further, according to FIGS. 1 and 2, in an alternative embodiment, a deflation module 6 is arranged on the vacuumizing shell 3.

Further, according to FIGS. 1 and 3, in an alternative embodiment, the deflation module 6 includes a one-way valve shaft 61 that is connected with the vacuumizing shell 3 and a button 62 that controls the motion of the one-way valve shaft 61. When pressing the button 62, the one-way valve shaft 61 blocks the vacuumizing shell 3 and prevent external air from entering the vacuumizing shell 3. When pulling up the button 62, the one-way valve shaft 61 moves upward, the external air enters the vacuumizing shell 3, and the suckers 1 release the mosaic tile.

Embodiment III

The deflation module 6 is further optimized based on Embodiment II.

Further, according to FIGS. 2 and 3, in an alternative embodiment, the deflation module 6 includes a control rod 63 and a reset spring 64, wherein the control rod is clamped on the one-way valve shaft 61 and controls its vertical motion, and the reset spring is connected with the end, far away from the one-way valve shaft 61, of the control rod 63.

Further, according to FIGS. 2 and 3, in an alternative embodiment, the control rod 63 includes a clip joint 631 that clamps the one-way valve shaft 61, a rotating groove 632 that extends from the side, far away from the one-way valve shaft 61, of the clip joint 631 and a rotating arm 633 that extends from the side, far away from the clip joint 631, of the rotating groove 632. The rotating arm 633 and the button 62 are connected with the reset spring 64. When not pressing the button 62, the reset spring 64 supports the rotating arm 633, and the rotating arm 633 blocks the vacuumizing shell 3 downward and prevents air from entering the vacuumizing shell 3. After starting the suction pump 4 in this state, the suckers 1 can suck the mosaic tile. When pressing the button 62, the rotating arm 633 motions downward, the clip joint 631 drives the one-way valve shaft 61 to motion upward, and the suckers 1 release the mosaic tile after the external air enters the vacuumizing shell 3.

Embodiment IV

The structure of the paving device is further optimized based on Embodiment III.

Further, according to FIG. 2, in an alternative embodiment, the deflation module 6 is partially arranged in the handle 2. Specifically, the button 62 is arrange outside the handle, and other parts are installed in the handle 2, which reduces the overall volume of the paving device and convenient to use.

Further, according to FIG. 2, in an alternative embodiment, a hollow case 7 is arranged between the handle 2 and the vacuumizing shell 3. Both the suction pump 4 and the battery 5 are arranged in the hollow case 7. Therefore, the volume can be further reduced, the weight of the paving device can be increased, and the pressing force during tile paving can be reduced. Moreover, the routing of wire penetrates through the hollow case 7 and connected with the switch 21 through the handle 2, such hiding way is more reasonable in layout and higher in safety.

Further, according to FIG. 4, in an alternative embodiment, the suckers 1 are two-layer or multi-layer vacuum sucker heads. The retraction stroke of the two-layer or multi-layer sucker heads is larger so that the mosaic tile can be close to the bottom of the vacuumizing shell 3.

Specific working process: After holding the handle 2, the suckers 1 are close to the mosaic tile. The switch 21 is pressed to start the suction pump 4 and suck air from the vacuumizing shell 3. The suckers 1 retract and suck the mosaic tile tightly and make it close to the bottom of the vacuumizing shell 3. Therefore, the mosaic tile can keep in level relatively. The mosaic tile is pressed on the surface to be paved. After stopping the suction pump 4 with the switch 21, the button 62 is pressed to press the rotating arm 633 and make the rotating groove 632 rotate. The clip joint 631 drives the one-way valve shaft 61 to move upward, the air enters the suckers 1 and the suckers 1 release the mosaic tile. Therefore, the paving device can pave mosaic tile more smoothly at a faster speed.

The above is only a better embodiment of the invention but has no restrictions to the invention. Any modification, equivalent replacement or improvement made within the spirit and principle of the invention shall be included in the protection scope of the invention.

The invention claimed is:

1. A mosaic tile paving device, comprising:
a plurality of suckers and a handle;
the plurality of suckers are installed on a vacuuming shell;
the plurality of suckers and a plurality of mosaic tiles are fixed together or separated by changing an air volume in the vacuuming shell;
the handle is connected on the vacuuming shell;
wherein a deflation module is arranged on the vacuuming shell;
the deflation module includes a one-way valve shaft that is connected with the vacuuming shell and a button that controls the motion of the one-way valve shaft;
the deflation module includes a control rod and a reset spring, wherein the control rod is clamped on the one-way valve shaft and controls its vertical motion, and the reset spring is connected with the end, far away from the one-way valve shaft, of the control rod.

2. As described in claim 1, the mosaic tile paving device is characterized in that: the vacuuming shell sucks air by connecting with a suction pump.

3. As described in claim 2, the mosaic tile paving device is characterized in that: the suction pump supplies energy by connecting with a battery.

4. As described in claim 3, the mosaic tile paving device is characterized in that: a hollow case is arranged between the handle and the vacuuming shell; both the suction pump and the battery are arranged in the hollow case.

5. As described in claim 2, the mosaic tile paving device is characterized in that: a switch that controls the start and stop of the suction pump is arranged on the handle.

6. As described in claim 1, the mosaic tile paving device is characterized in that: the control rod includes a clip joint that clamps the one-way valve shaft, a rotating groove that extends from the side, far away from the one-way valve shaft, of the clip joint and a rotating arm that extends from the side, far away from the clip joint, of the rotating groove; wherein the rotating arm and the reset spring are connected with a button.

7. As described in claim 1, the mosaic tile paving device is characterized in that: the deflation module is partially arranged in the handle.

\* \* \* \* \*